(12) United States Patent
Bohizic et al.

(10) Patent No.: US 8,364,461 B2
(45) Date of Patent: Jan. 29, 2013

(54) REUSING INVALIDATED TRACES IN A SYSTEM EMULATOR

(75) Inventors: Theodore J Bohizic, Hyde Park, NY (US); Reid T Copeland, Markham (CA); Ali Sheikh, Markham (CA); Kirk A Stewart, North York (CA)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/614,656

(22) Filed: Nov. 9, 2009

(65) Prior Publication Data

US 2011/0112820 A1    May 12, 2011

(51) Int. Cl.
    G06F 9/455    (2006.01)
(52) U.S. Cl. ............... 703/23; 717/136; 717/138
(58) Field of Classification Search ............ 703/17, 703/23, 20
    See application file for complete search history.

(56) References Cited

U.S. PATENT DOCUMENTS

| | | | | |
|---|---|---|---|---|
| 5,560,013 | A * | 9/1996 | Scalzi et al. ................. | 717/138 |
| 5,845,103 | A * | 12/1998 | Sodani et al. ................. | 712/216 |
| 5,926,832 | A * | 7/1999 | Wing et al. ................... | 711/141 |
| 5,958,061 | A * | 9/1999 | Kelly et al. ................... | 714/1 |
| 6,031,992 | A * | 2/2000 | Cmelik et al. ................ | 717/138 |
| 6,470,492 | B2 | 10/2002 | Bala et al. | |
| 6,820,255 | B2 * | 11/2004 | Babaian et al. .............. | 717/151 |
| 7,444,499 | B2 | 10/2008 | Davis et al. | |
| 7,444,553 | B2 | 10/2008 | Kimura | |
| 7,624,384 | B2 * | 11/2009 | Zhang et al. ................. | 717/136 |
| 2002/0066081 | A1 | 5/2002 | Duesterwald et al. | |
| 2006/0036834 | A1 | 2/2006 | Maiyuran et al. | |
| 2007/0154547 | A1 | 7/2007 | Flanner et al. | |
| 2007/0226700 | A1 | 9/2007 | Gal et al. | |
| 2008/0154547 | A1 | 6/2008 | Levine et al. | |
| 2008/0172655 | A1 | 7/2008 | Davia | |
| 2008/0177989 | A1 | 7/2008 | Mitran et al. | |
| 2008/0215920 | A1 | 9/2008 | Mayer et al. | |

OTHER PUBLICATIONS

Li et al, "Module-aware Translation for Real-life Desktop Applications", VEE'05, Chicago, Illinois, Jun. 11-12, 2005.*
Nohl et al, "A Universal Technique for Fast and Flexible Instruction-Set Architecture Simulation", DAC, Jun. 10-14, 2002.*
Reshadi et al, "Instruction Set Compiled Simulation: A Technique for Fast and Flexible Instruction Set Simulation", DAC, Jun. 2-6, 2003.*
Pilla et al "Value Predictors for Reuse Through Speculation on Traces" Proceedings of the 16th Symposium on Computer architecture and High Performance Computing, pp. 1-8, 2004.
Baumann et al. "RplTrc: A Tool for Emulating Real Network Dynamics for Performance Evaluation", 9th International Conference on Telecommunications—ConTEL 2007, pp. 219-226.
Mong et al. "DynamoSim: A Trace-based Dynamically Compiled Instruction Set Simulator", IEEE 2004, pp. 131-136.
Lai et al. Selective, Accurate, and Timely Self-Invalidation Using Last-Touch Prediction. pp. 139-148, ISCA, 2000.

*Primary Examiner* — Mary C Jacob
(74) *Attorney, Agent, or Firm* — John E. Campbell; Steven Chiu

(57) ABSTRACT

Native code corresponding to an invalidated trace is re-used in a system emulator. A first trace is identified. A dropped second trace is identified. The dropped second trace is associated with a first native code for emulating the second trace. If the identified first trace corresponds to the dropped second trace, the first native code is associated to the first trace, and the first native code is executed. If the identified first trace does not correspond to the dropped second trace, a second native code for emulating the first trace is created, the second native code is associated with the first trace, and the second native code is executed.

15 Claims, 5 Drawing Sheets

```
# ls
# my_prog
# ls
```
300
FIG.3
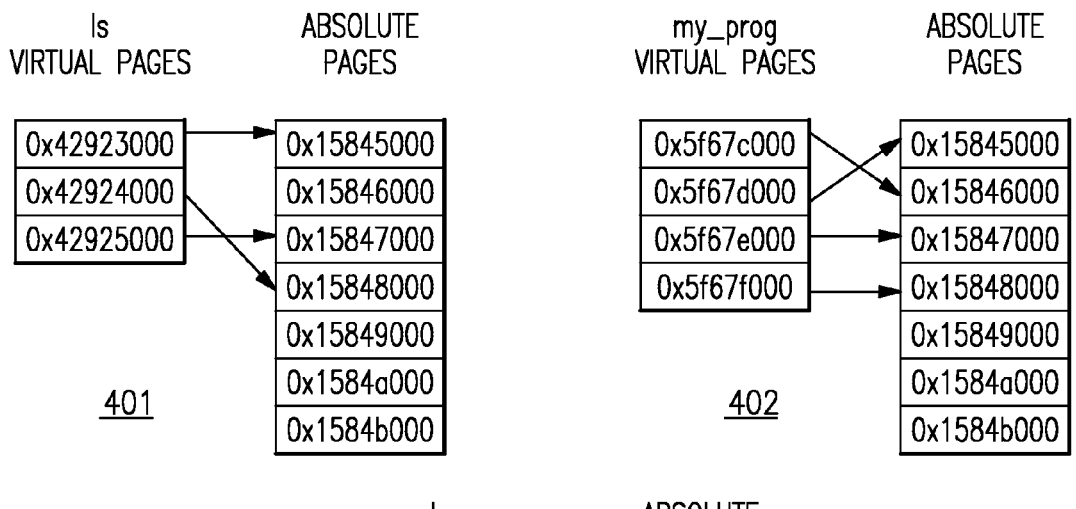
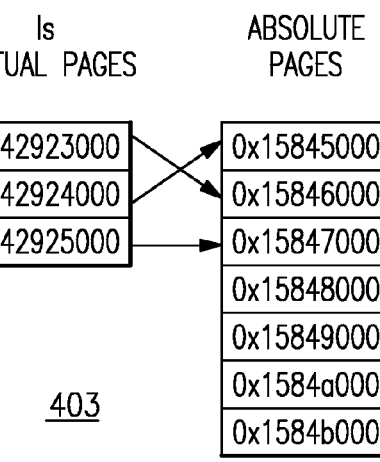
FIG.4

REUSING INVALIDATED TRACES IN A SYSTEM EMULATOR

BACKGROUND

The present invention relates, in general, to traces used within a processing environment, and in particular, to reusing invalidated traces within the processing environment.

A System Virtual Machine (SVM) or Emulator is a piece of software for creating a virtual execution environment. This software allows operating systems and programs written for a particular computation environment (e.g. a processor architecture having an instruction set) to be executed within a different computation environment (e.g. a different processor architecture having another instruction set). An SVM may translate or compile instructions from the emulated architecture (guest architecture) to instructions that are native to the system on which the SVM is being executed (host architecture). This translation can be performed by an interpreter, a just-in-time (JIT) compiler, or by both an interpreter and a JIT.

An SVM that incorporates a JIT compiler chooses sequences of guest instructions that are compiled to native instructions (a semantic routine) and then executed. These sequences of guest instructions are referred to as traces. A single trace may be executed many times. It may be part of a frequently executed program module in the guest operating system (OS) or guest application program, or it may be part of a loop in an emulated program for example. It is therefore worthwhile for the SVM to cache the JIT-compiled native code for the most recently compiled traces. This allows the SVM to reuse the compiled native code without the cost of compilation on future executions of the trace.

Cached native code may correspond to guest instructions in guest memory. If those guest instructions are overwritten then the corresponding cached native code becomes stale. It should not be reused as it no longer reflects the execution state of the guest system. Stale traces may therefore be invalidated (dropped) from the SVM's code cache.

BRIEF SUMMARY

According to one embodiment of the present invention, a computer implemented method, system, and program product is provided for emulating execution of a trace in guest memory and reusing or resurrecting an invalidated or dropped trace. The computer identifies a first trace. The computer identifies a dropped second trace. The dropped second trace is associated with a first native code for emulating the second trace. If the identified first trace is determined to correspond to the dropped second trace, then the first native code is associated to the first trace, and the first native code is executed. If the identified first trace is determined not to correspond to the dropped second trace, then a second native code for emulating the first trace is created, the second native code is associated to the first trace, and the second native code is executed.

According to another embodiment of the present invention, the dropped second trace is an invalidated trace that no longer reflects an execution state of a guest system.

According to another embodiment of the present invention, an address in the dropped second trace is updated to reflect an address in the first trace.

According to another embodiment of the present invention, associating the first compiled native code to the first trace comprises updating an address in the first native code to reflect an address in the first trace.

According to another embodiment of the present invention, a first signature associated with the first trace is compared with a second signature associated with the dropped second trace. The first signature is a representation of a content of the first trace and the second signature is a representation of a content of the dropped second trace.

According to another embodiment of the present invention, a first content of the first trace is compared with a second content of the dropped second trace.

According to another embodiment of the present invention, the dropped second trace and the second signature is stored in a dropped trace table.

BRIEF DESCRIPTION OF THE SEVERAL VIEWS OF THE DRAWINGS

FIG. 3 depicts an example of a sequence of program executions.

FIG. 4 depicts an example mapping of virtual memory pages to real memory pages for each instruction in FIG. 3.

DETAILED DESCRIPTION

In accordance with an aspect of the present invention, a capability is provided for reusing invalidated traces in a system emulator or SVM. In particular, the native code associated with the invalidated (dropped) traces for code that has been moved in memory (relocated) are reused or resurrected. This allows the SVM to use native code for relocated guest code without full recompilation.

As one example, an emulator or SVM includes a tracing function (e.g., a recording routine) that traces the instructions being emulated. It is initially turned on when the emulator is started and is turned off at a predetermined point, such as a branch. The set of instructions executed during that time is referred to as a trace. At the branch, another trace may be started to collect another set of instructions, etc. One or more traces are provided during execution of the emulator. The sequence of instructions of a trace may include instructions across different code boundaries, such as across user applications and the operating system, as well as across code that communicates with the application being traced.

"DEFINING MEMORY INDIFFERENT TRACES HANDLES," (U.S. patent application Ser. No. 11/625,898) filed Jan. 23, 2007 and assigned to IBM, incorporated herein by reference, describes a handle for a trace that is memory indifferent. The handle is created using contents of the trace rather than memory location of the trace. This enables the trace to be easily identified in subsequent runs of an application associated with the trace.

Figure 1:
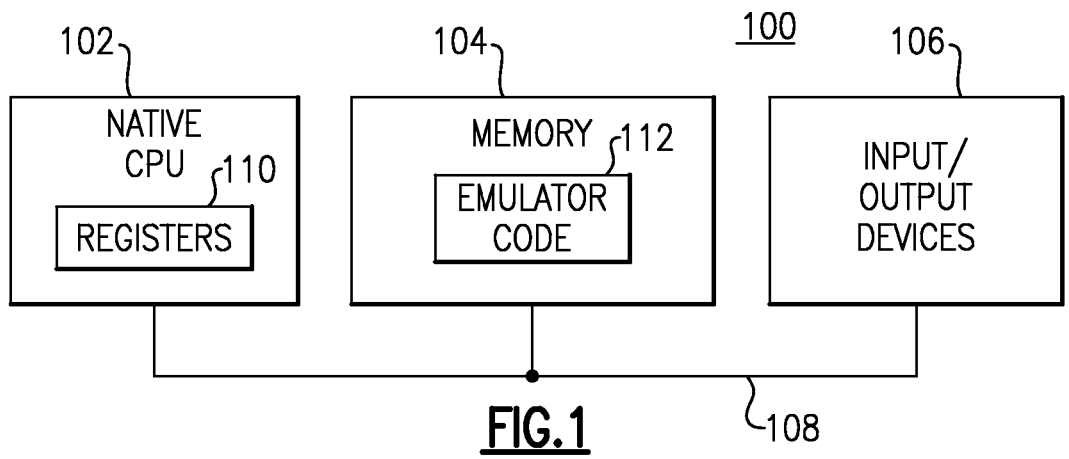
FIG. 1 depicts one embodiment of a processing environment to incorporate and use one or more aspects of the present invention.

One embodiment of a processing environment to incorporate and use one or more aspects of the present invention is described with reference to FIG. 1. In this example, a processing environment 100 is based on one architecture, which may be referred to as native architecture, but emulates another architecture, which may be referred to as guest architecture. The native architecture may include a host memory, which comprises physical memory, virtual memory, or a combination thereof. The guest architecture may include a guest memory, which comprises physical memory, virtual memory, or a combination thereof. Processing environment 100 may include a native processor 102 (e.g. a central processing unit (CPU)), a memory 104 (e.g. main memory), and one or more input/output (I/O) devices 106 coupled to one another via, for example, one or more buses 108.

Native central processing unit 102 may include one or more native registers 110, such as one or more general purpose registers and/or one or more special purpose registers, used during processing within the environment. These registers may include information that represent the state of the environment at any particular point in time.

Moreover, native central processing unit 102 may execute instructions and code that is stored in memory 104. In one particular example, the central processing unit executes emulator code 112 stored in memory 104. This code enables the native processing environment configured in one architecture (host architecture) to emulate another architecture (guest architecture).

Figure 2:
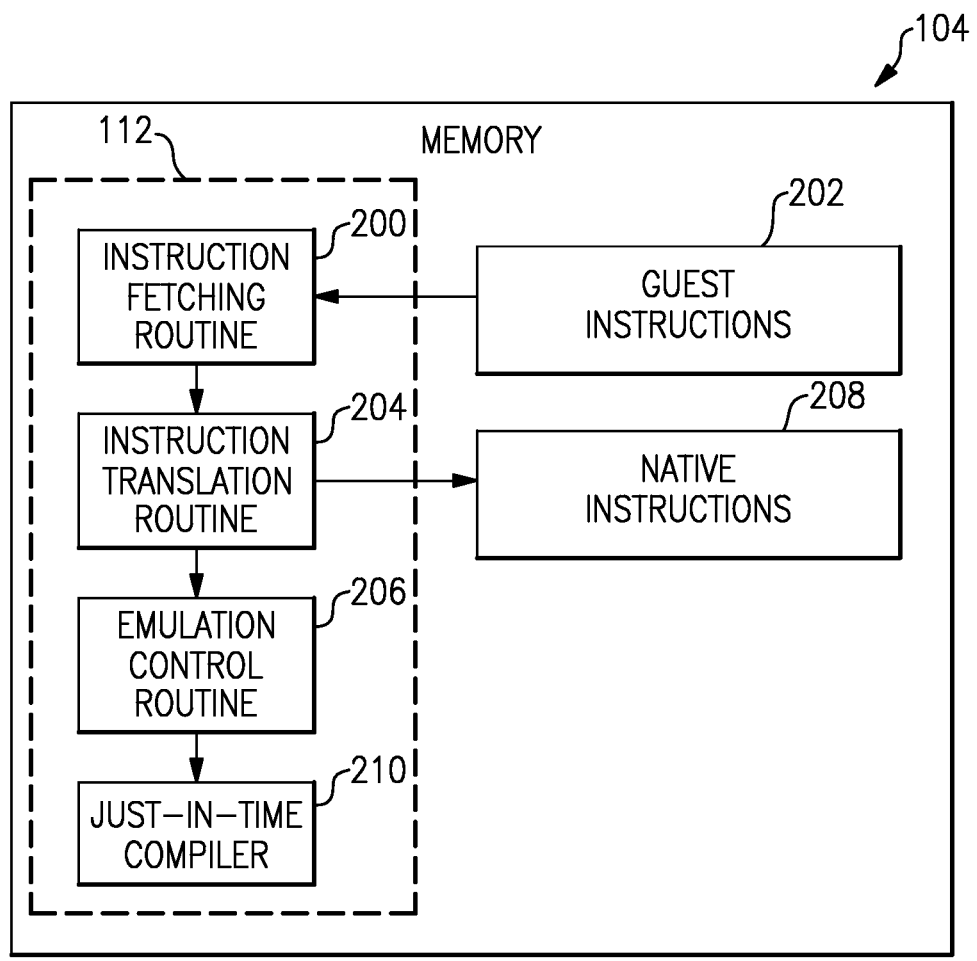
FIG. 2 depicts a detailed embodiment of the memory of FIG. 1, in accordance with one or more aspects of the present invention.

Further details relating to emulator code 112 (emulator) are described with reference to FIG. 2. In one example, emulator code 112 includes an instruction fetching routine 200 to obtain one or more guest instructions from guest memory 202, and to optionally provide local buffering for the one or more obtained instructions. Guest instructions comprise software instructions (e.g., machine instructions) that were developed to be executed in an architecture other than that of native CPU 102.

Emulator 112 also includes an instruction translation routine 204 to determine the type of guest instruction that has been obtained and to translate the guest instruction into zero or more corresponding native instructions 208. This translation includes, for instance, identifying the function to be performed by the guest instruction and choosing the native instructions to perform that function.

Furthermore, emulator 112 includes an emulation control routine 206 to cause the native instructions to be executed. Emulation control routine 206 may cause native CPU 102 to execute a routine of native instructions that emulate one or more previously obtained guest instructions and, at the conclusion of such execution, to return control to the instruction fetching routine to emulate the obtaining of the next guest instruction or guest instructions. Execution of native instructions 208 may include loading data into a register from memory 104; storing data back to memory from a register; or performing some type of arithmetic or logical operation, as determined by the translation routine.

Each routine is, for instance, implemented in software, which is stored in memory and executed by native central processing unit 102. In other examples, one or more of the routines or operations are implemented in firmware, hardware, software or some combination thereof. The registers of the emulated guest processor may be emulated using registers 110 of the native CPU or by using locations in memory 104. In one or more embodiments, guest instructions 202, native instructions 208, and emulation code 112 may reside in the same memory or may be dispersed among different memory devices.

An accumulation of guest instructions (a trace) that have been processed by the fetch and control routines is further provided, in one embodiment, to a Just-In-Time compiler 210. The Just-In-Time compiler is a dynamic compiler that, at the time guest instructions are to be executed, examines the guest instructions, looks for opportunities to remove redundancies and generates a matching sequence of instructions on the native platform on which the emulator is running. While the emulator has visibility to one instruction at a time, the Just-In-Time compiler has visibility to a plurality of instructions, preferably a sequence of instructions. Since it has visibility to a sequence of instructions, it can attempt to look for redundancies in the sequence of instructions and remove them. Furthermore the compiler can take advantage of the native architecture to provide a more efficient execution than would be had by compiling each guest instruction separately.

FIG. 3 describes an example of a sequence of program executions 300 (e.g. program executions that contains sequence of guest source code routines having corresponding guest instructions) that could be executed in an emulated environment. The '1s' command is executed twice, while the 'my_prog' command is executed once in between the two '1s' invocations.

Further details regarding an embodiment for the mapping between virtual and absolute pages in the guest system during each command in FIG. 3 is described with reference to FIG. 4. As shown in 401, the first invocation of '1s' uses three virtual pages containing guest instructions (code), with three corresponding virtual addresses, that are mapped to three absolute pages, with three corresponding absolute addresses. The code on these pages is compiled by the JIT to native code (native semantic routine) and is cached. When '1s' completes, their virtual address space is retired by the OS and 'my_prog' is dispatched. 402 shows how its four code pages are mapped. Note that the absolute pages formerly allocated to '1s' are reused by 'my_prog'. They are therefore overwritten, causing the SVM to drop the cached traces, including its corresponding native code, from '1s'. The SVM is free to compile and cache the new guest code that is on these pages and its corresponding native code.

When 'my_prog' finishes, '1s' is dispatched again. The page mapping for this invocation is shown in 403. The same three virtual code pages are allocated, however they are mapped to different absolute pages than in the previous instance of the '1s'. That is, while the virtual addresses remain the same, they point to three different absolute addresses. The SVM will drop any stale traces from 'my_prog' that were formerly on those absolute pages, and will recompile and cache the traces for '1s'.

One embodiment of a code cache and a dropped trace table, in accordance with an embodiment of the present invention, is described with reference to FIG. 5. The code cache and the dropped trace table are both located in host memory. The code cache 501 contains a mixture of valid and invalid traces (guest code) 504 and their corresponding validity flag 503 and native code 505. Guest code 504 may contain address references 506, and native code may contain address references 507. Address references may comprise virtual addresses, absolute references, or a combination thereof. When a trace is valid (i.e. the cached code corresponds to the guest code in guest memory) the flag 503 is set to 1. When the trace is invalid, the flag 503 is set to 0.

Figure 5:
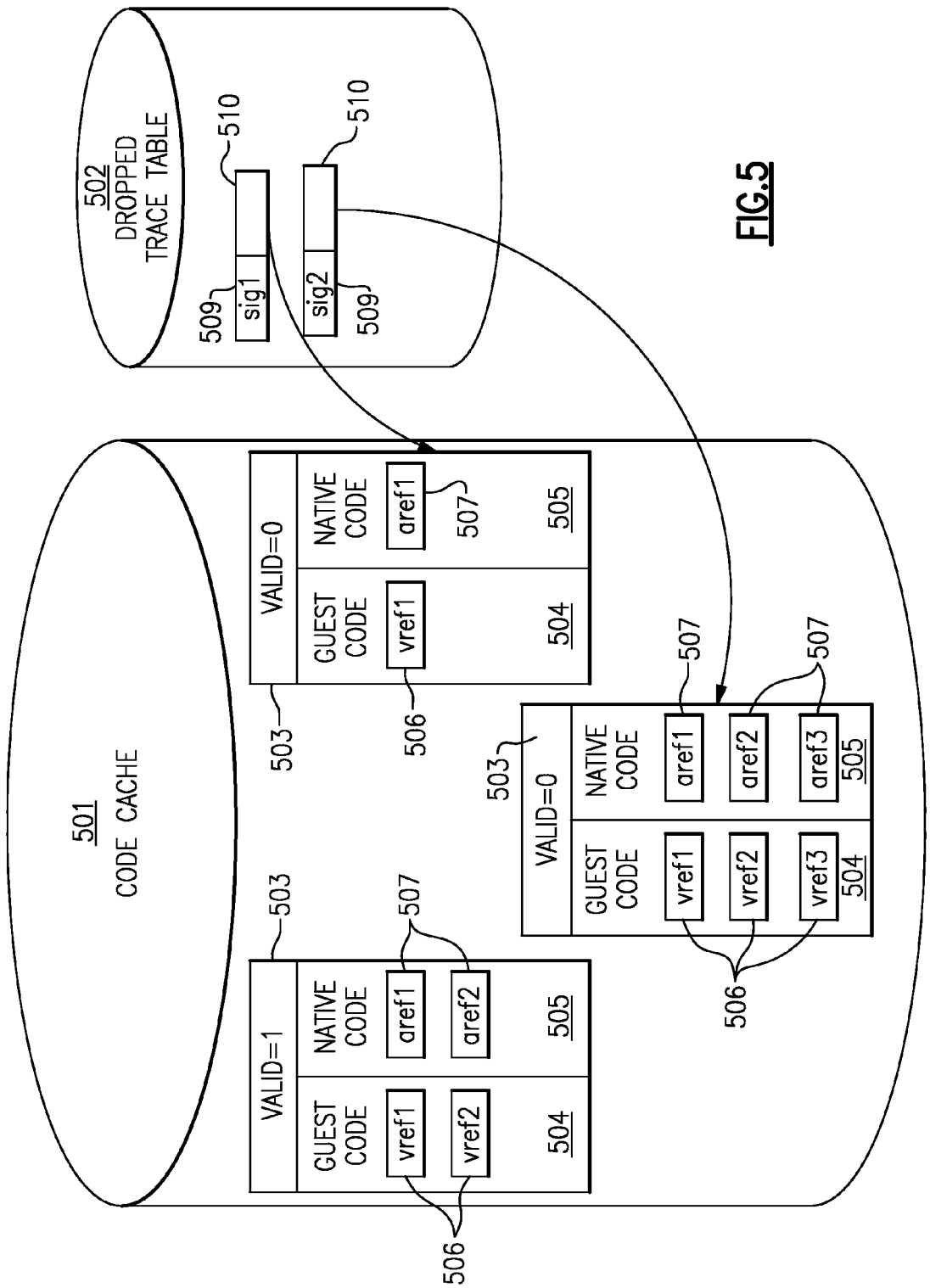
FIG. 5 depicts a code cache and a dropped trace table, in accordance with one or more aspects of the present invention.

FIG. 5. further describes a dropped trace table 502. Dropped trace table 502 may contain a signature 509 and a pointer 510. The Dropped trace table may comprise multiple entries, each containing a signature 509 and a pointer 510. The pointer 510 points to an invalid trace (valid=0) in the code cache 501. Each dropped trace may have an associated signature and pointer in the dropped trace table. The signature may be generated based on the contents of the trace, for example, through the use of a hash. The use of a hash table, as implied by the signatures, is only one possible implementation.

Figure 6:
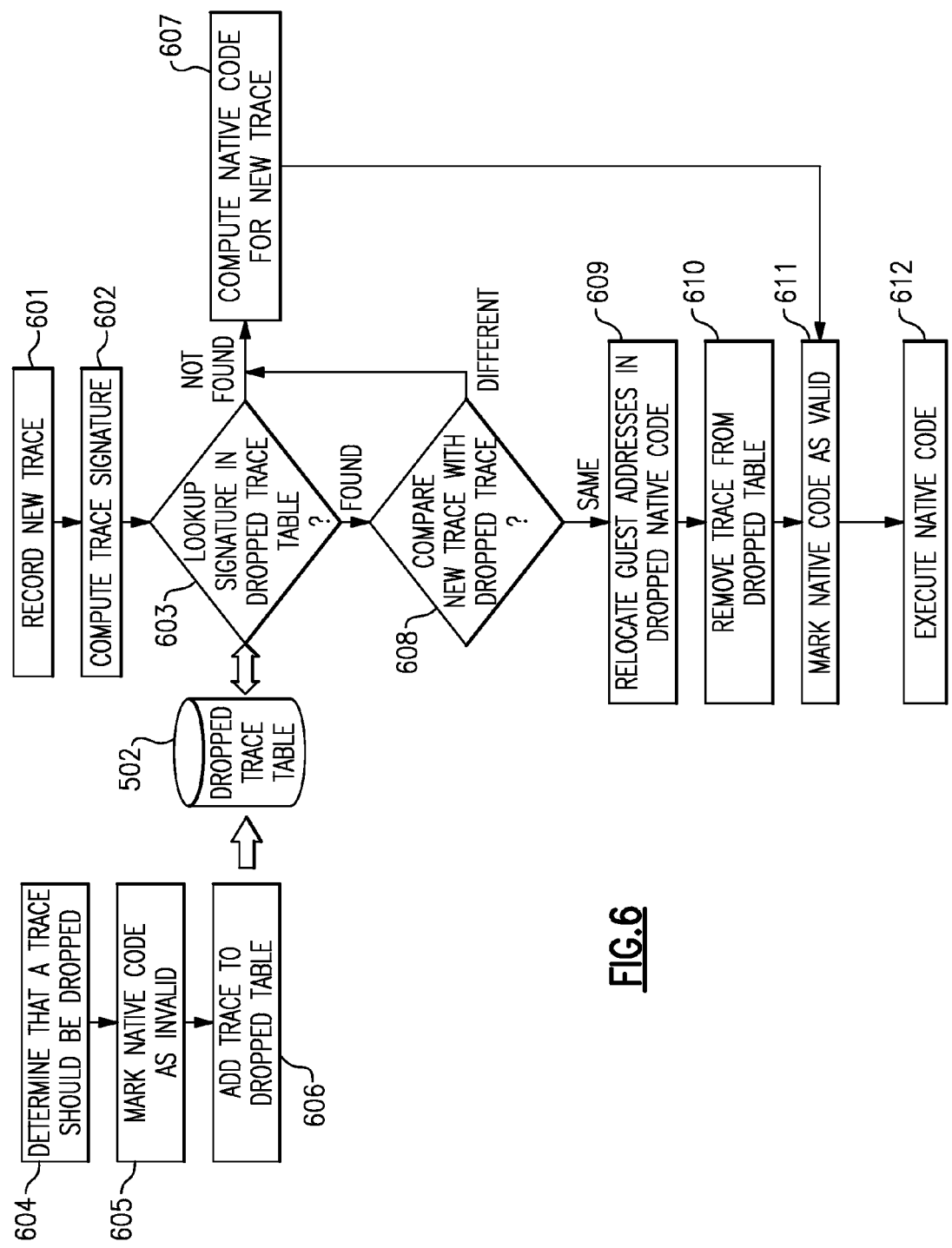
FIG. 6 depicts a flowchart for one embodiment of the resurrection process.

Details regarding an embodiment for the resurrection of a dropped trace are described with reference to FIG. 6. A new trace is recorded in the guest architecture, 601. Once recorded, an new signature based on the content of the new trace is generated, 602. The new signature is then used to determine if an identical signature is already stored in dropped trace table, 603.

If it is determined that there is no matching signature in the dropped trace table 502, the native code for the new trace is compiled, 607. The compiled native code 505, as well as a copy of the guest code 504 and valid flag 503, is stored in the code cache 501. The valid flag 503 for the trace stored in the code cache 501 is marked valid, e.g. valid flag 503 is set to 1, 611. The native code may then be executed, 612.

If it is determined that there is a matching signature in the dropped trace table, 603, then the new trace may be compared with the dropped trace, 608. If the new trace does not contain identical instructions as the dropped trace, native code for the new trace is compiled, 607, and the process continues on with 611. If the new trace contains identical instructions as the dropped trace, then the native code for the dropped trace corresponding to the matching dropped trace signature 509 may be resurrected. The address references 506, 507 in the matching dropped trace (guest code) and its associated native code are updated to reflect the new address locations that correspond with the new trace, 609. The matching dropped trace is then removed from the dropped trace table 502 by removing the dropped trace signature 509 and the pointer 510 from the dropped trace table 502, 610. The native code associated with the matching dropped trace is then marked as valid, 611, e.g. valid=1. The native code may then be executed, 612.

In another embodiment in the trace resurrection process, during the comparison of the new trace with the dropped trace, 608, the virtual addresses reflecting the location of the instructions for the new trace and the dropped trace may be compared. If the virtual addresses for the instructions are identical, then 609-611 proceed. If the virtual addresses for the instructions are not identical, then native code for the new trace is compiled 607 and marked as valid 611.

Regarding the dropped trace table 502, when a trace has finished and has been determined to be dropped, a signature and a pointer pointing to the location of the dropped trace in the code cache is stored. First, a determination may be made to see if a trace should be dropped, 604. This determination is done by checking to see if the guest instructions in guest memory have been overwritten. Once the trace is determined to be dropped, the native code in the code cache 501 is marked as invalid (e.g. valid flag 503 located in code cache 501 is set to 0), 605. The previous trace is then added to the dropped trace table 502, 606. As stated previously, regarding FIG. 5, in an embodiment of the dropped trace table 502, the signature 509 of the dropped trace and a pointer 510 to the location of the dropped trace in the code cache 501 is stored into the dropped trace table 502.

An SVM may update any information contained in the native code associated with a new trace trace, to reflect that trace in guest memory. This includes allowing the SVM to update any address information that may be contained in the native code, to reflect the relocation of that trace in guest memory. Address information may comprise virtual addresses, absolute addresses, or a combination thereof. It should be noted that unless the native code is moved in host memory, it is not necessary to update code that encapsulates native address information, such as relative branches or memory accesses. Once these updates are complete, the trace may be re-enabled or resurrected. It can then be used for execution by the SVM and handled like any normally compiled trace. This allows the SVM to execute and reuse resurrected traces a plurality of times in a non serial fashion. With this embodiment, dropped traces may be reused even if their executions are interleaved with other traces, thus being independent of any re-use access pattern.

In a further embodiment, the SVM may update any information contained in the dropped trace itself to reflect a new trace in guest memory. This includes allowing the SVM to update any address information that may be contained in the dropped trace, to reflect the relocation of that trace in guest memory. Address information may comprise virtual addresses, absolute addresses, or a combination thereof.

In another embodiment, a specific example is presented. A trace (T1) is recorded containing the following guest code instructions:

0x1000 AR R1, R2 #add R1 and R2 into R1
0x1002 BCR 0xf, R1 #branch to the virtual address pointed to by R1
0x2000 SR R1, R2 #subtract R2 from R1 into R1

Because the second instruction 0x1002 is an indirect branch, only one possible path has been recorded. Next time this trace is executed, R1 and R2 could have different values, where it would branch to a different virtual address. Therefore, the compiled native code corresponding to the guest code may include a test before the execution of the third instruction 0x2000 to ensure that it is the same branch target as originally recorded. The compiled native code may contain code such as:

mov eax, [location of R1] # map R1 to the native register eax
mov ebx, [location of R2] # map R2 to the native register ebx
add eax, ebx # perform the addition
mov [location of R1], eax # update the guest architectural state
cmp edx, 0x5f000 # check if the run-time target is the same as the one that was recorded (assuming 0x2000 virtual address is mapped to 0x5f000 absolute address
jne traceExit # if it is different then exit the trace
sub eax, ebx # do the subtraction (third instruction in the trace)
mov [location of R1], eax # update the guest architectural state In this embodiment of the invention, because the page tables may be changed at any time, instead of referencing the virtual address 0x2000 directly, the absolute address 0x5f000 originally associated with virtual address 0x2000 is used instead. This removes the issue for future executions of the trace where even if the branch target still has a virtual address of 0x2000, there may be different target instructions. 0x2000 is a virtual address reference in the guest code, while 0x5f000 is an absolute address reference in the native code. The guest code and its corresponding native code may be stored in a code cache located in host memory.

Assuming T1 is dropped (invalidated), an entry is created for it in the dropped trace table. A signature, which may be based upon the binary encoding of the guest instructions, is calculated. The signature may be calculated through the use of a hash. The signature and a pointer pointing to the dropped trace in the code cache are stored in the entry.

At a later point in time, a new trace (T2) is recorded with the following instructions:

0x8000 AR R1, R2 #add R1 and R2 into R1

0x8002 BCR 0xf, R1 #branch to the virtual address pointed to by R1
0xa000 SR R1, R2 #subtract R2 from R1, into R1

A signature is generated for T2 and compared against the signatures stored in the dropped trace table. If a match is found, rather than compiling the new trace, the dropped trace is resurrected. Assume a match is found with dropped trace T1. Before declaring the dropped trace T1 as valid, the embedded absolute address 0x5f000 in the associated native code may be updated. Therefore, virtual address 0xa000 in T2 is translated to obtain, for example, absolute address 0x9f00. The native code associated with T1 is then updated to as follows:

mov eax, [location of R1] # map R1 to the native register eax
mov ebx, [location of R2] # map R2 to the native register ebx
add eax, ebx # perform the addition
mov [location of R1], eax # update the guest architectural state
cmp edx, 0x9f000 # check if the run-time target is the same as the one that was recorded (assuming 0xa000 virtual address is mapped to 0x9f000 absolute address
jne traceExit # if it is different then exit the trace
sub eax, ebx # do the subtraction (third instruction in the trace)
mov [location of R1], eax # update the guest architectural state Once this update is complete, the native code of T1 can be used for T2. Therefore, the native code for dropped trace T1 has been resurrected for use for the new trace T2.

In a further embodiment, regarding the example stated above, after the signatures for new trace T1 and dropped trace T2 have been determined to be identical, the contents of the new trace T2 are compared with the contents of the dropped trace T1. If the content matches up instruction for instruction, then it may be determined that both T2 and T1 contain the same instructions. The resurrection process as stated above then continues.

In a further embodiment, regarding the example stated above, the virtual addresses reflecting the location of the instructions in dropped trace T1 and new trace T2 may be compared after the signature comparison step. If the virtual addresses match up and the contents of dropped trace T1 and new trace T2 match up, then the addresses for the native code in the matching dropped trace T1 may be updated to reflect the new trace T2.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Figure 7:
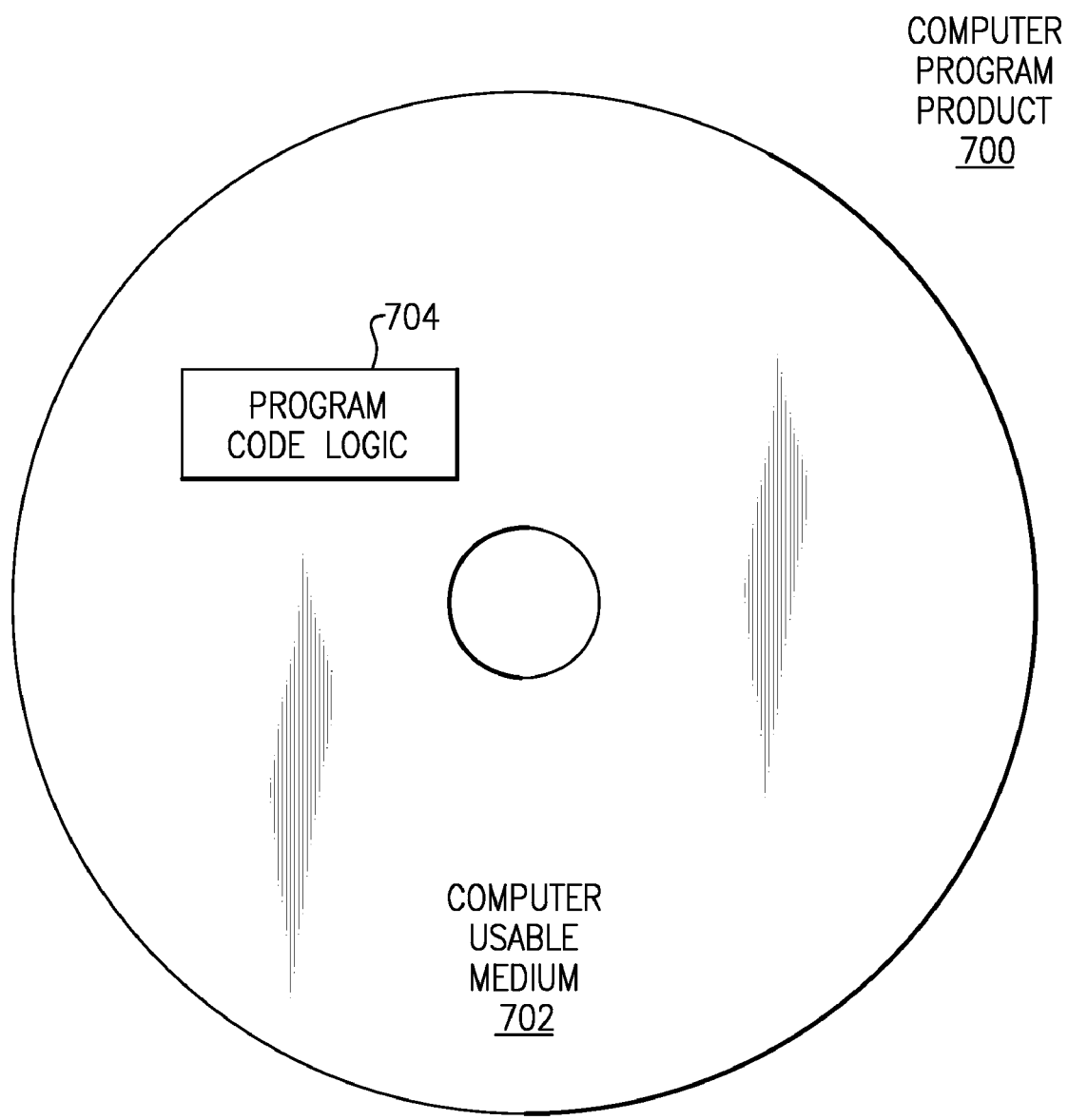
FIG. 7 depicts one embodiment of a computer program product to incorporate one or more aspects of the present invention.

One example of a computer program product incorporating one or more aspects of an embodiment of the present invention is described with reference to FIG. 7. A computer program product 700 includes, for instance, one or more computer usable media 702 to store computer readable program code means or logic 704 thereon to provide and facilitate one or more aspects of an embodiment of the present invention. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for emulating execution of a trace in guest memory comprising:
   identifying by said computer a first trace;
   identifying by said computer a dropped second trace, wherein said dropped second trace is associated with a first native code for emulating said second trace;
   determining whether said identified first trace corresponds to said dropped second trace;
   based on said determining that said identified first trace corresponds to said dropped second trace, performing a through b comprising:
      a) associating said first native code to said first trace, said associating comprising updating an address in said first native code to reflect an address in said first trace; and
      b) executing said first native code; and
   based on said determining that said identified first trace does not correspond to said dropped second trace, performing c through e comprising:
      c) creating a second native code for emulating said first trace,
      d) associating said second native code to said first trace, and
      e) executing said second native code.

2. The method according to claim 1, wherein said dropped second trace is an invalidated trace that no longer reflects an execution state of a guest system.

3. The method according to claim 1, further comprising based on said determining that said identified first trace corresponds to said dropped second trace, updating an address in said dropped second trace to reflect an address in said first trace.

4. The method according to claim 1, wherein said determining whether said identified first trace corresponds to said dropped second trace comprises comparing a first content of said first trace with a second content of said dropped second trace.

5. The method according to claim 1, wherein said determining whether said identified first trace corresponds to said dropped second trace comprises:
   comparing a first signature associated with said first trace with a second signature associated with said dropped second trace, wherein said first signature is a representation of a content of said first trace and said second signature is a representation of a content of said dropped second trace; and
   to based on determining that said first signature corresponds to said second signature, comparing a first content of said first trace with a second content of said dropped second trace.

6. The method according to claim 5 further comprising storing said dropped second trace and said second signature in a table.

7. A computer system for reusing dropped traces comprising:
   a memory;
   a processor in communications with said memory, said processor capable of performing a method comprising:
   identifying by said computer system a first trace;
   identifying by said computer system a dropped second trace, wherein said dropped second trace is associated with a first native code for emulating said second trace;
   determining whether said identified first trace corresponds to said dropped second trace;
   based on said determining that said identified first trace corresponds to said dropped second trace, performing a through b comprising:
      a) associating said first native code to said first trace, said associating comprising updating an address in said first native code to reflect an address in said first trace; and
      b) executing said first native code; and
   based on said determining that said identified first trace does not correspond to said dropped second trace, performing c through e comprising:
      c) creating a second native code for emulating said first trace,
      d) associating said second native code to said first trace, and
      e) executing said second native code.

8. The computer system according to claim 7, wherein said dropped trace is an invalidated trace that no longer reflects an execution state of a guest system.

9. The computer system according to claim 7, further comprising responsive to determining that said identified first trace corresponds to said dropped second trace, updating an address in said dropped second trace to reflect an address in said first trace.

10. The computer system according to claim 7, wherein said determining whether said identified first trace corresponds to said dropped second trace comprises comparing a first signature associated with said first trace with a second signature associated with said dropped second trace, wherein said first signature is a representation of a content of said first trace and said second signature is a representation of a content of said dropped second trace.

11. The system according to claim 10 further comprising storing said dropped second trace and said second signature in a dropped trace table.

12. The computer system according to claim 7, wherein said determining whether said identified first trace corresponds to said dropped second trace comprises comparing a first content of said first trace with a second content of said dropped second trace.

13. A computer program product for re-using dropped traces, the computer program product comprising:
   a non-statutory storage medium readable by a processing circuit and storing instructions for execution by the processing circuit for performing a method comprising:
   identifying by said computer a first trace;
   identifying by said computer a dropped second trace, wherein said dropped second trace is associated with a first native code for emulating said second trace;
   based on determining that said identified first trace corresponds to said dropped second trace, performing a through c comprising:
      a) associating said first native code to said first trace, said associating comprising updating an address in said first native code to reflect an address in said first trace; and
      b) executing said first native code; and
   based on determining that said identified first trace does not correspond to said dropped second trace, performing c through e comprising:
      c) creating a second native code for emulating said first trace, d) associating said second native code to said first trace, and e) executing said second native code.

14. The computer program product according to claim 13, wherein said dropped second trace is an invalidated trace that no longer reflects an execution state of a guest system.

15. The computer program product according to claim 13, further comprising responsive to determining that said identified first trace corresponds to said dropped second trace, updating an address in said dropped second trace to reflect an address in said first trace.

\* \* \* \* \*